Sept. 19, 1939.  J. M. CORBETT  2,173,158
TRAIL BUILDER
Filed July 6, 1936  5 Sheets-Sheet 1

INVENTOR:
JOHN M. CORBETT,
Fad Adams
ATTORNEY.

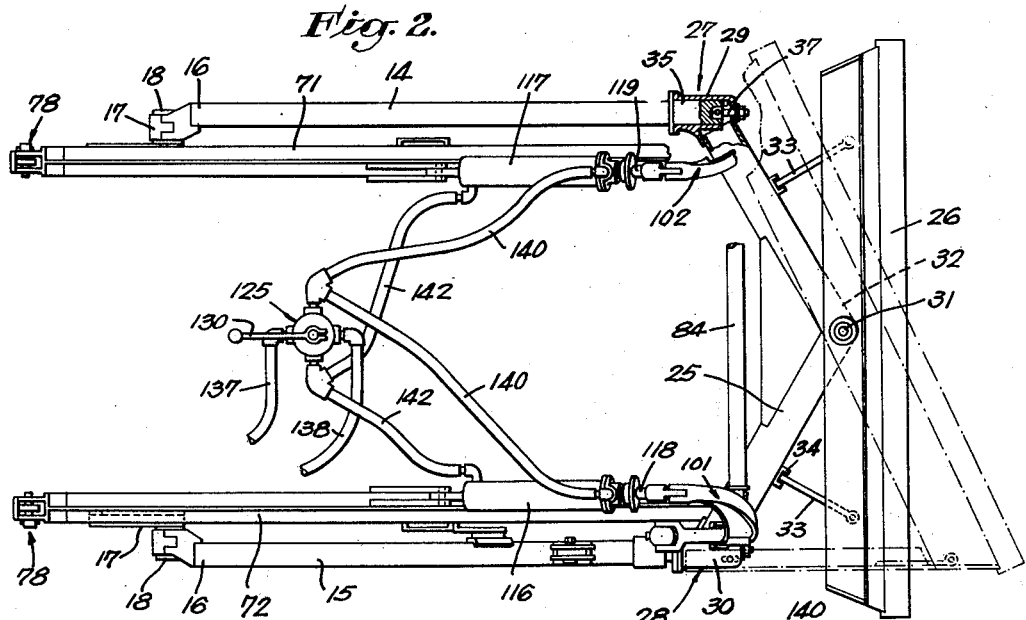
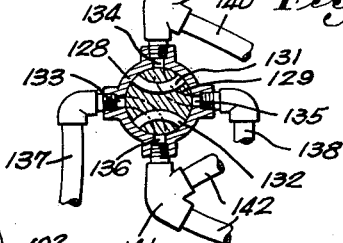
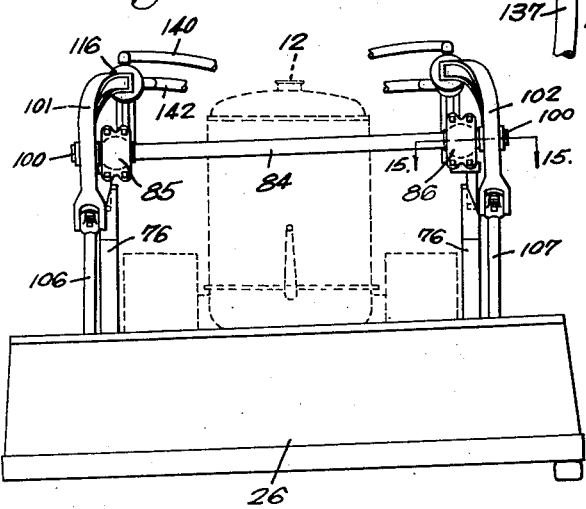
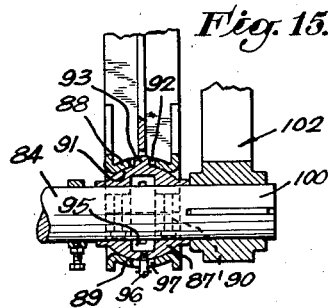

Sept. 19, 1939. J. M. CORBETT 2,173,158
TRAIL BUILDER
Filed July 6, 1936 5 Sheets-Sheet 3
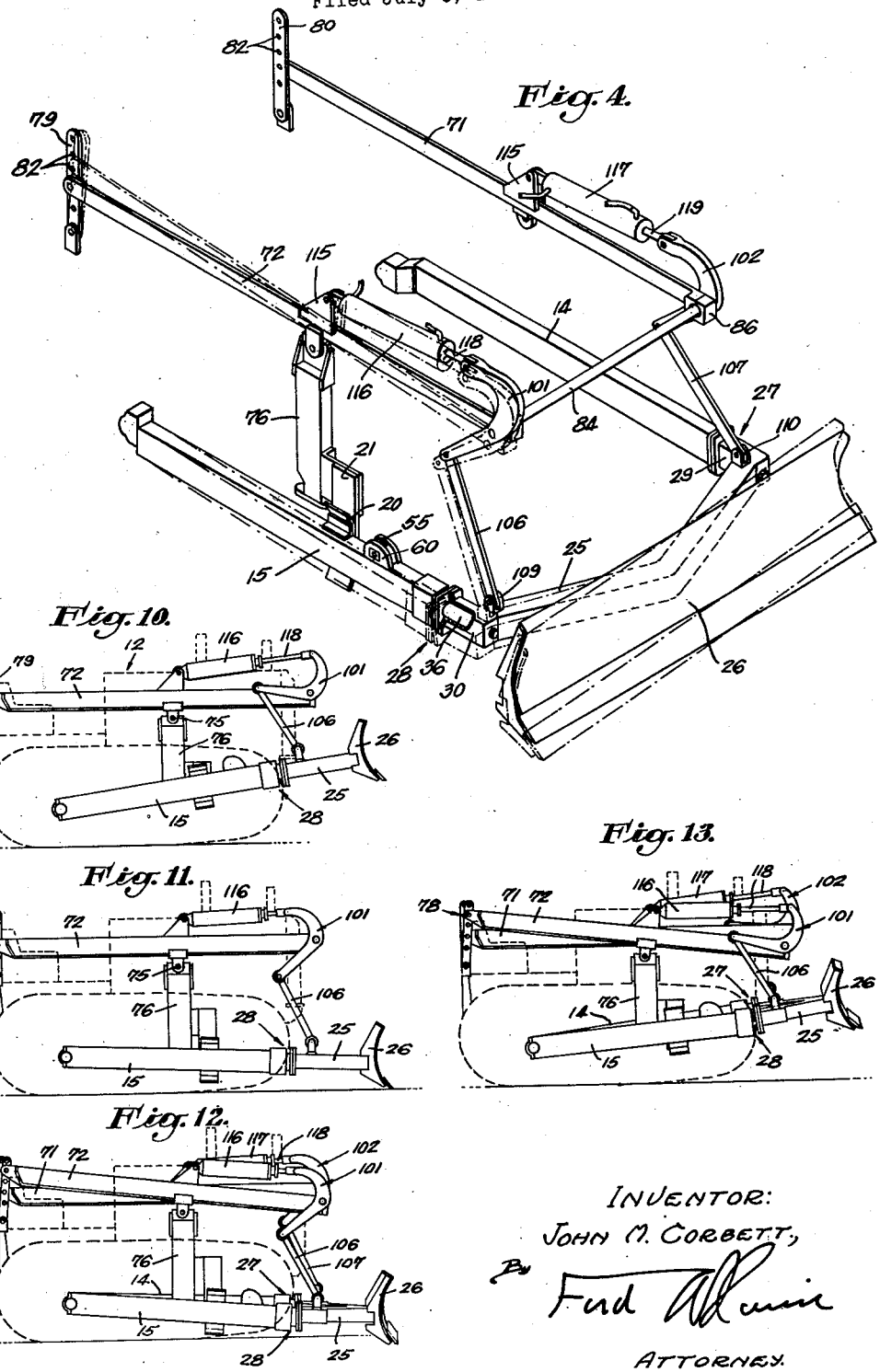
INVENTOR:
JOHN M. CORBETT,
By Fred A. [illegible]
ATTORNEY.

Sept. 19, 1939.    J. M. CORBETT    2,173,158
TRAIL BUILDER
Filed July 6, 1936    5 Sheets-Sheet 4
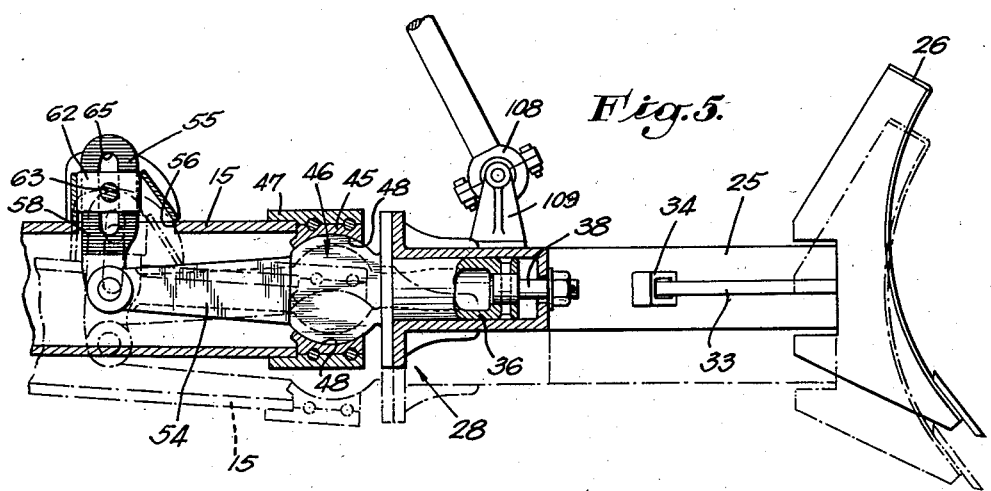
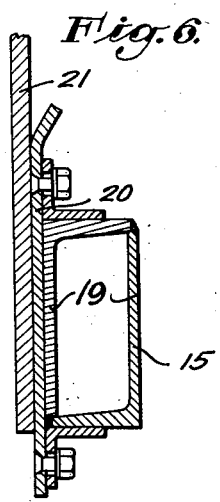
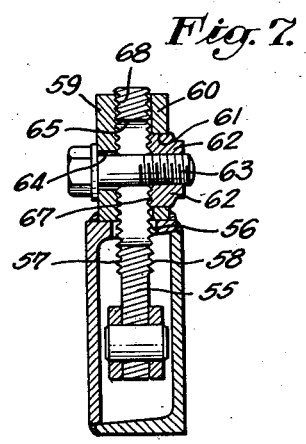
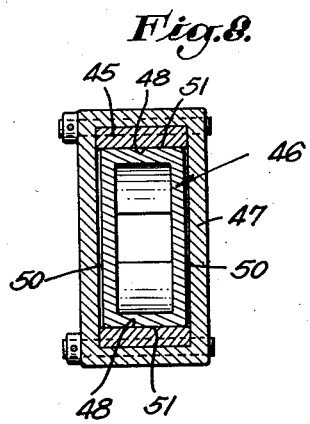
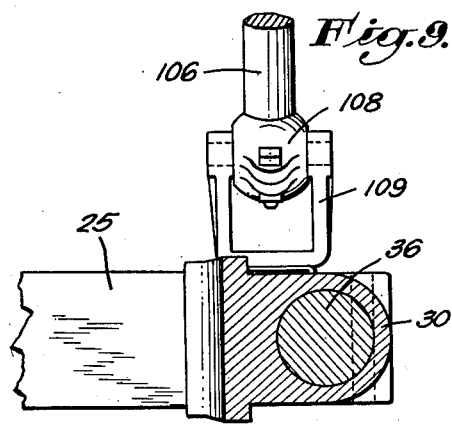
INVENTOR:
JOHN M. CORBETT,
By
Fred A. Davis
ATTORNEY.

Sept. 19, 1939.    J. M. CORBETT    2,173,158
TRAIL BUILDER
Filed July 6, 1936    5 Sheets-Sheet 5

INVENTOR:
JOHN M. CORBETT,
By Fred W. Raum
ATTORNEY.

Patented Sept. 19, 1939

2,173,158

UNITED STATES PATENT OFFICE 2,173,158

TRAIL BUILDER

John M. Corbett, Huntington Park, Calif., assignor to Emsco Derrick & Equipment Company, Los Angeles, Calif., a corporation of California Application July 6, 1936, Serial No. 89,171

10 Claims. (Cl. 37—144)

My invention relates to earth moving apparatus commonly used for surface scraping and leveling, refilling trenches, etc. More particularly the invention relates to an earth moving machine of this type which is adapted to be carried by a tractor and includes a blade carrying frame supported so as to be raised and lowered relative to the ground.

It is an object of my invention to provide an earth moving apparatus including a blade or earth engaging structure supported by push members connected to the tractor in which movable joints are provided for connecting the earth engaging structure with the push members, and in which at least one of said movable joints permits angular movement of its associated push member in order to permit one of the push members to swing relative to the other in a manner to tilt the earth engaging structure.

It is a further object of my invention to provide a construction of the character pointed out in the foregoing description in which one of the movable joints is provided in the form of and constitutes a universal joint means.

It is a still further object of my invention to provide earth moving apparatus of the general character referred to in which the earth engaging structure may be raised or lowered bodily into its desired elevational position, and in which it may be tilted into a suitable transverse position and may be raised or lowered bodily in such transverse tilted position.

A still further object of my invention is to provide an earth moving apparatus constituting an earth moving assembly which includes an earth engaging structure and push members for supporting the same, which push members are connected to the tractor, and in which the earth moving assembly has embodied in its movable joints which permit transverse tilting, and in which adjustable means is provided whereby one of the push members may have angular movement relative to its associated push member, thus permitting a transverse tilting of the earth engaging structure without placing any strains or twists in any of the parts.

It is an object of the invention to provide in a device of the character described means for attaching an earth engaging blade or structure to the blade carrying frame or push members in such a manner that the blade may be adjusted in either a straight bulldozing position in which the blade is perpendicular relative to the length of the tractor, or in various right or left oblique angled positions relative to the tractor.

It is another object of the invention to provide operating mechanism for raising or lowering the blade carrying frame.

It is another object of the invention to provide means whereby the blade carrying frame may be tilted transversely when it is desired to angle the blade carried thereby with respect to the surface of the ground operated over.

The novel means for accomplishing the above mentioned functions includes relatively spaced push members pivoted for independent longitudinal swinging movement, a rigid blade carrying frame supported on the forward ends of the push members by pin and socket joints which permit relative transverse rotation of the frame relative to the push members, together with operating mechanism for relatively pivoting the push members to transversely tilt the frame and the blade carried thereby with respect to the axes of the push members.

It is an important object of the invention to provide adjustment means associated with the pin and socket joints of at least one of the push members whereby the axes of both of the joints may be maintained parallel, when the push members are relatively pivoted to transversely tilt the blade carrying frame, to relieve twisting stress on the push members.

It is another object of the invention to provide operating mechanism for simultaneously pivoting the push members to raise and lower the blade carrying frame regardless of the relatively pivoted position of the push members.

It is another object of the invention to provide means for relatively pivoting the push members to tilt the blade carrying frame and for locking the push members and thus the frame in various relative pivoted positions.

This object is accomplished by means comprising a pair of centrally pivoted suspension beams, the rearward ends of which are independently anchored in various positions and the forward ends of which carry the operating mechanism of the invention; thus, relatively pivoting the suspension beams results in a relative pivoting of the push members to transversely tilt the blade carrying frame, the operating mechanism being capable of simultaneously pivoting the push members to raise and lower the blade carrying frame regardless of the relative pivoted positions of the suspension beams and the push member.

In the detailed description of my invention which is to follow I have shown certain embodiments of my invention. It should be understood, however, that I believe my invention to be broadly new and that the same is not limited to the details of construction and precise combination of parts to be described. I recognize that others in the art upon learning the principle of my invention may construct other forms of apparatus incorporating the principles thereof. I therefore wish my invention to be broadly construed in accordance with the spirit and scope thereof and in accordance with the appended claims.

These, as well as additional objects, will be made clear in the following part of the specification, read in connection with the accompanying drawings.

In the drawings,

Fig. 2 is a top plan view of my apparatus.

Fig. 3 is a front elevational view, illustrating the manner in which an earth engaging blade included in the apparatus may be tilted with respect to the ground.

Fig. 4 is a diagrammatic perspective view of the apparatus illustrated in Figs. 1, 2, and 3.

Fig. 5 is an enlarged sectional view of a portion of the apparatus disclosed in Fig. 1, this view illustrating in detail an adjustable swivel joint which supports the blade carrying frame of the apparatus.

Figure 1:
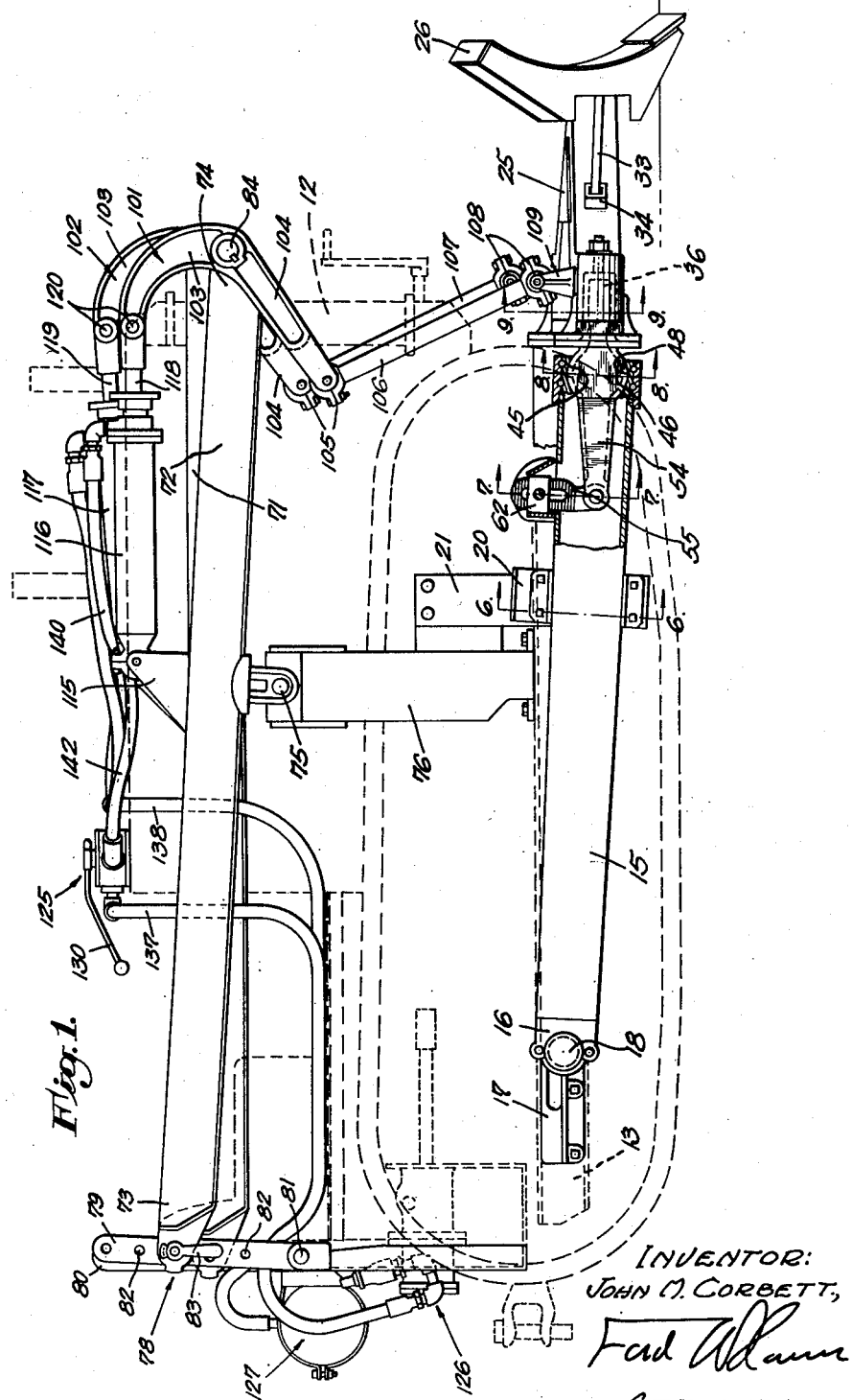
Fig. 1 is a side elevational view of my apparatus, illustrated as being carried for operation by a tractor.

Figs. 6, 7, 8, and 9 are respectively enlarged sections taken as indicated by the lines 6—6, 7—7, 8—8, and 9—9 of Fig. 1.

Figs. 10, 11, 12, and 13 are diagrammatic views illustrating the blade carrying frame of the device in various positions, Figs. 10 and 11 illustrating the blade in a straight bulldozing position relative to the grounds, and Figs. 12 and 13 illustrating the blade in a tilted position with respect to the ground.

Fig. 14 is a sectional view of a four-way control valve for the hydraulic actuating means of the apparatus.

Fig. 15 is a fragmentary sectional view taken as indicated by the line 15—15 of Fig. 3.

Figure 16:
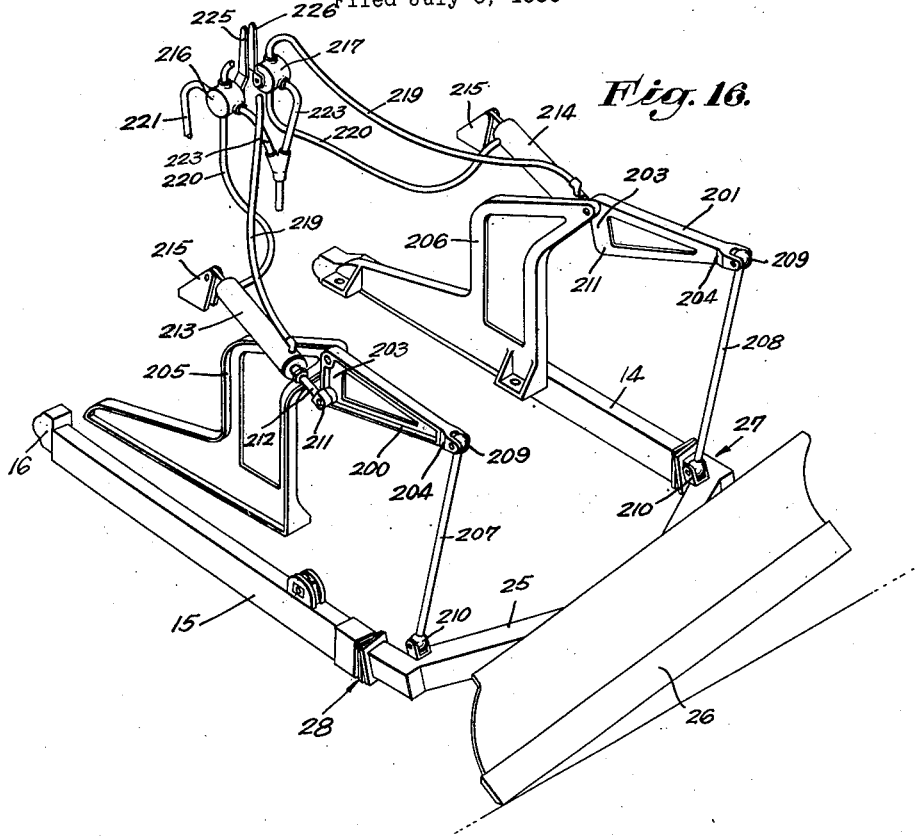

Fig. 16 is a diagrammatic perspective view of an alternative form of apparatus.

Figure 17:
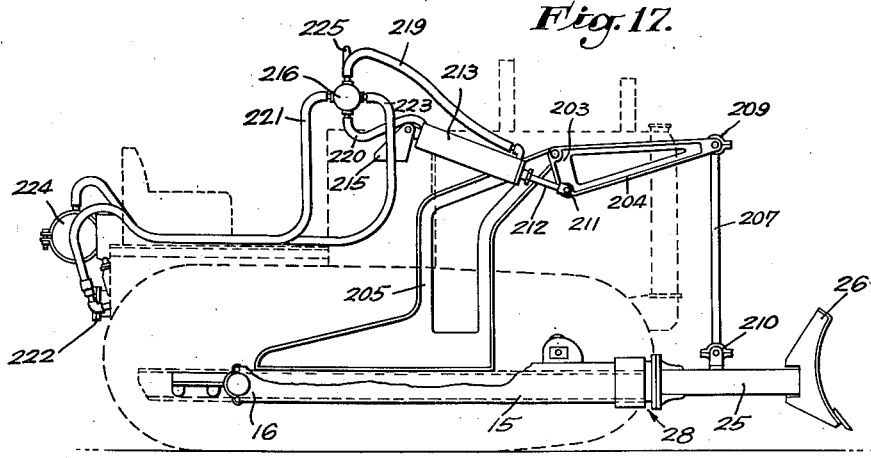

Fig. 17 is a side elevational view of the apparatus shown in Fig. 16, this view indicating the relationship between the apparatus and a tractor upon which the apparatus is adapted to be carried.

Referring at first to Figs. 1, 2, 3, and 4, I have indicated in dotted lines a tractor 12 which includes a track frame 13 upon which my earth moving machine is adapted to be carried and operated. The apparatus includes a pair of push members 14 and 15 which are pivoted at their rearward ends 16 to the track frame 13 of the tractor, as by suitable brackets 17 which provide pivot bearings 18. The push members 14 and 15 extend longitudinally on opposite sides of the tractor and are free for independent longitudinal swinging movement in vertical planes. As shown in Fig. 6, these push members are preferably formed of two angle irons 19 welded or otherwise secured together longitudinally, and at a point intermediate the ends thereof are provided with foot portions 20 secured to the inner sides thereof which foot portions engage wear plates 21 secured to the track frame 13, the plates 21 serving as a guide means for the push members when they are pivoted upwardly and downwardly during the operation of the device.

Carried by the forward ends of the push members 14 and 15 is a blade carrying frame 25 to which is secured an earth engaging blade 26, which parts 25 and 26 may be broadly designated as an earth engaging structure, the frame being connected to the push members 14 and 15 by swivel or movable joints, generally designated by the numerals 27 and 28. The push members 14 and 15, and the frame 25, and blade 26 may be broadly referred to as an earth moving assembly. The frame 25 comprises a rigid V-shaped structure having integrally formed bearing sockets 29 and 30 which respectively form parts of the swivel joints 27 and 28. The preferred form of mounting the blade 26 on the blade carrying frame 25 comprises a king pin and bearing arrangement 31 which pivotally supports the center of the blade 26 at the apex 32 of the V-shaped frame 25, as shown in Fig. 2. Radius rods 33 are employed to maintain the blade 26 in desired angled relation with the frame 25. These rods, as shown in Fig. 2, may be mounted on the blade 26 and extended rearwardly to abut recessed members 34 provided on the frame 25. It will be seen that varying the length of these radius rods, the blade 26 may be positioned in the straight bulldozing position illustrated in solid lines in Figs. 2 and 4, or may be held in an oblique angled position with respect to the length of the tractor, as indicated by dotted lines in Fig. 2.

Fitting into the bearing sockets 29 and 30 are bearing pins 35 and 36 respectively mounted on the forward ends of the push members 14 and 15. The pins 35 and 36 are respectively provided with forwardly extending reduced diameter portions 37 and 38, projecting through openings in the end wall of the bearing sockets 29 and 30 to receive thrust washers and lock nuts which threadedly engage the outer ends of the reduced diameter portions 37 and 38 to retain the pins and bearing sockets together.

It will be seen that a relative pivoting of the push members 14 and 15 will result in the rigid frame 25 being twisted transversely with respect to the axes of the push members 14 and 15, as shown in Fig. 3, relative rotation between the pins 35 and 36 and the bearing sockets 29 and 30 occurring as the transverse tilting of the blade carrying frame occurs.

My invention includes a means for relieving side thrust or twisting stress on the push members 14 and 15 when the blade carrying frame is tilted transversely, as just described. One form of mechanism for accomplishing this purpose includes an adjustment means whereby at least one of the pins 35 or 36 may be adjusted to various angled positions with respect to the push member with which it is associated so that the bearing pins 35 and 36 may be maintained parallel when the push members 14 and 15 are relatively pivoted and the transverse tilting of the blade carrying frame occurs. My preferred form of adjustment for the bearing pins is shown in connection with the pin 36 in Figs. 1 and 5. This form comprises a socket portion 45 formed on the outer end of the push member 14 and a head portion 46 formed on the rearward portion of the pin 36 and which is pivotally received within the socket portion 45. The socket portion 45 is preferably provided in the form of a two-part insert member removably retained within a rectangular frame 47 suitably secured to the forward end of the push member 14, as shown, and which is provided with inward semi-cylindrical surfaces 48. The head portion 46 is preferably rectangular in cross section, as shown best in Fig. 8, having flat sides 50 and semi-cylindrical end surfaces 51 which engage and are retained by the semi-cylindrical surfaces of the socket portion 45. It will be seen that relative pivoting of the pin 36 into various angled positions relative to the longitudinal axis of the push member 14 occurs only in a single plane, which, in the embodiment shown, is a vertical plane. As a means for locking the pin 36 in various angled positions relative to the push member 14, I provide an arm 54 formed integrally with the head portion 46 to extend rearwardly therefrom within the hollow member 14 formed by the angle irons 19, the rearward end thereof being slotted for pivotal engagement with a slip member 55 having oppositely disposed toothed surfaces 57 and 58, and which extends upwardly through a slot 56 in the push member between relatively spaced plates 59 and 60 projecting upwardly from the upper surface of the push member 14, as shown in Figs. 5 and 7. One of the plates, such as the plate 60, is provided with a rectangular opening 61 in which is received a nut 62 having an inner toothed surface which engages the toothed surface 58 of the slip member, the nut 62 being drawn against this surface by a bolt 63 which extends through an opening 64 in the plate 59 and an elongated slot 65 formed in the slip member 55. The inner surface 68 of the plate 59 is likewise preferably provided with teeth for engagement with the toothed surface 57 of the slip member. In a broad sense, the swivel or movable joint 28 may be considered as including or having associated with it the adjusting means. It will be seen that the joint 28, when considered as including the swivel or movable joint and also the adjusting means, is in effect a universal joint.

In the embodiment shown, the pin and socket joint 27 is non-adjustable relative to the push member 15, the bearing pin 35 being fixed on the outer end of the push member 15, as shown in Fig. 2. In some instances, however, it is desirable to connect the blade carrying frame 25 to both of the push members 14 and 15 by use of two of the adjustable swivel joints 28.

The invention includes operating mechanism for relatively pivoting the push members 14 and 15 to transversely tilt the blade carrying frame 25, and for simultaneously pivoting the push members 14 and 15 regardless of their relative pivoted positions to raise and lower the blade 26 to and from engagement with the ground, the operating mechanism also including means for locking the push members 14 and 15 in various relatively pivoted positions. This operating mechanism includes a pair of longitudinally extending suspension beams 71 and 72 pivotally supported at points intermediate their rearward and forward ends 73 and 74 by suitable bracket members 75 which are pivotally connected to the upper ends of a pair of vertical support members 76 mounted on the track frame 13 of the tractor 12. The suspension beams 71 and 72 are free for independent longitudinal swinging movement in vertical planes. Anchor means for retaining the suspension beams 71 and 72 in relatively pivoted positions, or in parallel positions, is provided and includes a pair of anchor bars 79 and 80, pivoted as at 81, to the tractor 12 and which extend upwardly adjacent the rearward ends 73 of the suspension beams 71 and 72. The anchor bars 79 and 80 are provided with spaced openings 82 which are engaged by removable hand bolts 83 carried by the rearward ends 73 of the beams. Rotatably carried by the forward ends 74 of the beams 71 and 72, is a cross shaft 84 journalled to the beams by bearing members 85 and 86 which permit a limited relative vertical swinging movement of the respective ends 74 of the beams 71 and 72. Each of the bearing members 85 and 86 comprises, as best shown in Fig. 15, a ball member 87 fixed to the shaft 84; and a two-part housing including a body portion 88 secured to the ends of the beams 71 and 72 and a cap portion 89, which may be secured to the body portion 88 by bolts 90, the body portion 88 and the cap 89 cooperating to provide a spherical cavity 91 in which the ball portion 87 is rotatable. Formed in the body portion 88 on the longitudinal axis of the beams is an opening 92 through which a lug 93 formed on the ball portion 87 extends. The opening 92 is sufficiently larger than the lug 93 to permit considerable relative rotation between the ball portion 87 and the housing of the bearing members. Formed in the ball portion 87 so as to surround the shaft 84, is a grease retaining cavity 95 which is fed by a grease plug 96 which may extend outwardly through an opening 97 formed in the cap portion 89 of the bearing. Keyed to the outer ends 100 of the shaft 84 which extend outwardly through the bearing members 85 and 86 are a pair of bell cranks 101 and 102, the upper arms 103 of which curve rearwardly over the suspension beams 71 and 72 and the lower arms of which extend downwardly and rearwardly below the beams 71 and 72, substantially as shown in Fig. 1. Connected to the lower arms 104 of the bell cranks 101 and 102, preferably by ball and socket joints 105, are a pair of links 106 and 107. The lower ends of the links 106 and 107 are respectively secured, preferably by ball and socket joints 108 to a pair of brackets 109 and 110 mounted on the blade-carrying frame 25 adjacent the swivel joints 27 and 28.

Carried on each of the beams 71 and 72 is an upwardly extending bracket 115 to which is pivoted a pair of hydraulic cylinders 116 and 117, the reciprocating piston rods 118 and 119 thereof being respectively secured to the upper arms 103 of the bell cranks 101 and 102 by suitable pivotal connections 120, substantially as shown in the drawings. The hydraulic cylinders 116 and 117 and the control mechanism therefor comprise the actuating mechanism of the device.

The actuating mechanism comprises a control valve 125, a fluid pump 126, driven by means not shown, and a fluid supply reservoir 127 from which the pump 126 supplies fluid under pressure through the valve 125 to the cylinders 116 and 117 for actuating the operating means. The control valve 125 comprises a housing 128 mounted on the tractor 12 in a convenient location for the operator of the apparatus. Rotatable in the housing 128 is a plug 129 operable by a lever 130. The rotatable plug 129 is provided with two substantially semicircular fluid channels 131 and 132 which are movable upon rotation of the plug 129 to communicate between selected pairs of fluid ports 133, 134, 135 and 136 formed in the housing 128, as shown in Fig. 14. The fluid port 133 is connected to the discharge end of the pump 126, as by a pipe 137. The port 135 is connected to the supply reservoir 127 by an exhaust pipe 138. The port 134 is connected to a pair of pressure pipes 140, as by a double nipple 139, the other ends of the pipes 140 being in turn connected to the hydraulic cylinders 116 and 117 at points forward of the pistons thereof. The port 136 is connected, as by a double nipple 141, to a pair of pressure pipes 142 which in turn are connected to the hydraulic cylinders 116 and 117 at points to the rearward of the pistons thereof. The operation of my apparatus is as follows:

When it is desired to use the earth moving machine in a bulldozing position; that is, with the blade 26 in a straight position perpendicular to the length of the tractor 12, as shown in Figs. 10 and 11, the suspension beams 71 and 72 are positioned parallel and locked in this position by the anchor means 78. When it is desired to raise the blade carrying frame 25 and blade 26 from the earth engaging position, in which it is shown in Fig. 11, to the raised position, in which it is shown in Fig. 10; the rotatable plug 129 of the valve 125 is rotated so that the channel 132 communicates between the ports 133 and 136, whereupon fluid under pressure is delivered from the pump 126 through the pressure pipe 137, through the valve, and into the pressure pipes 142 connected with the rearward end of the hydraulic cylinders 116 and 117. When this occurs the piston rods 118 and 119 are simultaneously moved forward to rotate the bell cranks 101 and 102 into the position shown in Fig. 10 which, through the arms 104 of the cranks and the links 106 and 107, raised the blade carrying frame into the position shown in Fig. 10. To lower the blades 26 into earth-engaging position, the plug 129 may be rotated so that the fluid channel 132 communicates between the port 136 and the exhaust port 135 so that fluid in the cylinders 116 and 117 may return through the exhaust pipe 138 to the supply reservoir 127. If, however, it is desired that fluid pressure be applied to the blade-carrying frame to lower it into its earth-engaging position, the plug 129 may be rotated so that the channel 131 communicates between the port 133 and port 134 whereupon fluid under pressure from the pump is delivered through the supply pipe 137 and into the pressure pipe 140, thus delivering fluid under pressure into the cylinders 116 and 117 forward of the pistons thereof to retract the piston rods 118 and 119, resulting in the blade-carrying frame being forced downwardly by the bell cranks and connecting links. The actuating mechanism is also operated in this last described position when it is desired to exert a downward force on the blade 26 when the blade is in its earth-engaging position, as shown in Fig. 11. By manipulation of the control valve 125, the blade-carrying frame may be raised to any desired elevation between the positions shown in Figs. 10 and 11 and held in this position by rotating the plug 129 into a neutral position, shown in solid lines in Fig. 14, in which all of the ports 133 to 136 inclusive are closed.

When it is desired to operate the apparatus with the blade 26 in a transversely tilted position relative to the longitudinal axes of the tractor and of the push members 14 and 15, as shown in solid lines in Fig. 3 and in the diagrammatic utility views 12 and 13, one of the suspension beams, such as the beam 72, is pivoted relative to the suspension beam 71 by removing the hand bolts 83 and adjusting the rearward end 73 of the beam 72 to a higher opening 82 in the anchor bar 79. The resultant lowering of the forward end 74 of the suspension beam 72 allows the push member 15 to swing downwardly into the position in which it is indicated in dotted lines in Figs. 4 and 5, the resultant relative pivoting of the push members 14 and 15 causing the blade-carrying frame 25 and blade 26 to be tilted transversely. This movement of one push member relative to the other push member is referred to as an angular movement or as the moving of one push member into an angular position relative to the other. Furthermore, the position of the push member which has been so moved may be referred to as an angled position, since when so moved it occupies a position which is non-parallel with respect to the other of the push members. For example, when the push member 15 is so moved, it is non-parallel with respect to the push member 14. This operation may best be accomplished by blocking up one end of the blade 26, as indicated in Fig. 3, to suspend one end of the blade at a desired elevation while the other end thereof is lowered. Before the adjustment of the suspension beam 72 is made, the bolt 63 of the locking means associated with the adjustable bearing pin 36 is loosened to allow the pin 36 to be freely pivoted relative to the push member 15. When the forward ends of the suspension beam 72 and the push member 15 are lowered the pin 36 assumes an angled position with respect to the member 15, the axis of the pin 36 remaining parallel with the axis of the pin 35 as the blade-carrying frame is tilted transversely. When the blade 26 is tilted transversely to a desired degree, the anchor means 78 is adjusted to lock the rearward end 73 of the beam and the bolt 63 of the lock means for the adjustable pin 36 is tightened so as to rigidly hold the pin 36 in the angular position with respect to the push member 15 in which it is shown in dotted lines in Fig. 5.

Subsequent operation of the apparatus with the blade in its tilted position just described is exactly the same as when the blade is in its bulldozing or straight position previously described. It will be noted from an inspection of the drawings that the piston rods 118 and 119 and the bell cranks 101 and 102 are always in the same relative position with respect to their associated hydraulic cylinder regardless of the relatively pivoted positions of the suspension beams 71 and 72 and the push members 14 and 15. Thus it will be seen that when the plug 129 of the control valve is operated as before described, the bell cranks 101 and 102 are simultaneously operated to raise the blade-carrying frame from the work-engaging position shown in Fig. 12 to its raised position shown in Fig. 13, regardless of the relatively pivoted positions of the push members and regardless of the degree to which the blade-carrying frame 25 and the blade 26 are transversely tilted.

In the form of the device disclosed in Figs. 16 and 17, the operating mechanism of the apparatus does not include the suspension beams 71 and 72. The push members 14 and 15, the blade-carrying frame 25, the blade 26, and the means for supporting the blade-carrying frame for transverse tilting on the outer ends of the push members 14 and 15; namely, the swivel joint 27 which includes the pin 35 which is rigid with the push member 15 and the swivel joint 28 which includes the adjustable pin 36, are in this form identical with the parts described in the previously described form.

The operating mechanism of this form of the invention comprises a pair of bell cranks 200 and 201 having angled arms 203 and 204. The outer end of one of the arms of each crank, such as the arm 203, is pivotally connected to one of a pair of support members 205 and 206 mounted on the track frame of the tractor on opposite sides thereof. The outer ends of the arms 204 are connected to links 207 and 208 by suitable ball and socket joints 209, the other ends of the links being connected by ball and socket joints 210 to the blade-carrying frame, substantially as shown in the drawings. Pivotally connected to the elbow portions 211 of the cranks 200 and 201 are piston rods 212 of a pair of hydraulic cylinders 213 and 214, the rearward ends of these cylinders being pivoted to brackets 215, mounted on the track frame 13 in a manner similar to that shown in Fig. 1.

In this form of apparatus, the control mechanism comprises a pair of control valves 216 and 217, each of which has pressure pipes 219 communicating with the forward ends of the cylinders 213 and 214 and pressure pipes 220 communicating with the rearward ends of the cylinders 213 and 214 which the control valves 216 and 217 are operable to alternately connect with a pressure pipe 221 connected to the discharge end of a pump 222. Exhaust pipes 223 cannect the valves 216 and 217 with a supply reservoir 224, connected for supplying fluid to the intake end of the pump 222. The control valves 216 and 217 are provided with operating levers 225 and 226 positioned in side-by-side relation so that the levers may be independently operated or grasped together and operated simultaneously for a purpose which will be described in the mode of operation.

In the operation of this form of the invention, when it is desired to operate the apparatus with the blade 26 in the bulldozing or straight position in which it is shown in Fig. 17, the operating levers 225 and 226 of the control valves 216 and 217 are operated simultaneously to alternately connect the pressure pipes 220 and the pressure pipes 219 with the supply pipe 221 to raise and lower the blade-carrying frame and the blade 26 from a lowered earth-engaging position to a raised position, in a manner which will be clear from an inspection of the drawings.

When it is desired to operate the apparatus with the blade 26 in a transversely tilted position, as shown in Fig. 16, the blade 26 may be lowered upon a block, or the like, positioned under one end of the blade and the control lever of one of the valves, such as the valve 216, may be operated to connect the pressure pipe 221 with the pipe 219 which retracts the piston rod of the cylinder 211, resulting in the arm 204 of the bell crank 200 being forced downwardly to relatively lower the push member 14 with respect to the push member 15. This relative pivoting of the push members 14 and 15 results in the transverse tilting of the blade-carrying frame and the blade 26 with respect to the axes of the push members 14 and 15, in the manner described in connection with the previously described form. When the blade 26 is tilted to the desired degree, the locking mechanism associated with the adjustable swivel joint 28 may be tightened as before described. Subsequent raising and lowering of the blade-carrying frame is accomplished by grasping both of the control levers 225 and 226 so as to operate these levers simultaneously to simultaneously actuate the bell cranks 200 and 201.

I have illustrated and described my invention in simple and practical form, and it should be understood that I am aware of various changes that might be made and other embodiments thereof that might be devised without departing from the invention, the scope of which should be interpreted by the appended claims and not by the details of construction disclosed in the drawings and described herein.

I claim as my invention:

1. In an earth moving machine of the character described adapted to be carried by a tractor, the combination of: a pair of push members pivoted for independent vertical swinging movement on said tractor; a blade carrying frame; swivel joints connecting said push members and said frame for supporting said frame to tilt transversely with respect to the axes of said push members; and adjustment means associated with at least one of said swivel joints whereby the axes of said joints are maintained parallel when said push members are relatively pivoted to tilt said blade carrying frame.

2. In an earth moving machine of the character described adapted to be carried by a tractor, the combination of: a pair of push members pivoted for independent vertical swinging movement on said tractor; a longitudinally extending bearing pin on each of said push members; a blade carrying frame including bearing sockets journalled on said pins; and adjustment means associated with at least one of said push members and its bearing pin whereby said pins are maintained parallel when said push members are relatively pivoted to tilt said blade carrying frame.

3. In an earth moving machine of the character described adapted to be carried by a tractor, the combination of: a pair of push members pivoted for independent vertical swinging movement on said tractor; a blade carrying frame; pin and socket joints including axial pins on the outer ends of said push members for supporting said frame to tilt transversely with respect to the axes of said push members; and means for adjustably mounting the pin on one of said push members whereby said pins are maintained parallel when said push members are relatively pivoted to tilt said blade carrying frame.

4. In an earth moving machine of the character described adapted to be carried by a tractor, the combination of: a pair of push members pivoted for independent vertical swinging movement on said tractor; a longitudinally extending bearing pin on each of said push members; a blade carrying frame journalled on said pins to tilt transversely with respect to said push members when said push members are relatively pivoted; means for adjustably mounting the pin on one of said push members to maintain said pins parallel when said push members are relatively pivoted; and mechanism for simultaneously pivoting said push members regardless of their relative pivoted positions to raise and lower said blade carrying frame.

5. In an earth moving machine of the character described adapted to be carried by a tractor, the combination of: a pair of push members pivoted for independent vertical swinging movement on said tractor; a longitudinally extending bearing pin on each of said push members; a blade carrying frame journalled on said pins to tilt transversely with respect to said push members when said push members are relatively pivoted; means for adjustably mounting the pin on one of said push members to maintain said pins parallel when said push members are relatively pivoted; means for locking said push members in various relatively pivoted positions; and mechanism for simultaneously pivoting said push members regardless of their relative pivoted positions to raise and lower said blade carrying frame.

6. In an earth moving machine of the character described adapted to be carried by a tractor, the combination of: a pair of push members pivoted for independent vertical swinging movement on said tractor; a longitudinally extending bearing pin on each of said push members; a blade carrying frame journalled on said pins to tilt transversely with respect to said push members when said push members are relatively pivoted; means for adjustably mounting the pin on one of said push members to maintain said pins parallel when said push members are relatively pivoted; operating mechanism including a pair of suspension beams longitudinally pivoted above said push members, the rearward ends thereof being adjustably anchored and the forward ends thereof carrying cranks connected by links to said blade carrying frame whereby relative pivoting of said beams relatively pivots said push members; and actuating means simultaneously operating said cranks regardless of the relative pivoted positions of said beams and said push members to raise and lower said blade carrying frame.

7. In an earth moving machine of the character described adapted to be carried by a tractor, the combination of: a pair of push members pivoted for independent vertical swinging movement on said tractor; a longitudinally extending bearing pin on each of said push members; a blade carrying frame journalled on said pins to tilt transversely with respect to said push members when said push members are relatively pivoted; means for adjustably mounting the pin on one of said push members to maintain said pins parallel when said push members are relatively pivoted; a pair of suspension beams centrally pivoted for longitudinal swinging movement above said push members; anchor means associated with the rearward ends of said suspension beams for adjustably securing said beams in relatively pivoted positions; crank members carried by the forward ends of said beams; links connecting said crank members and said blade carrying frame; and actuating means for simultaneously operating said cranks regardless of the relative pivoted positions of said beams and said push members to raise and lower said blade carrying frame.

8. In an earth moving machine of the character described adapted to be carried by a tractor, the combination of: a pair of push members pivoted for independent vertical swinging movement on said tractor; a longitudinally extending bearing pin on each of said push members; a blade carrying frame journalled on said pins to tilt transversely with respect to said push members when said push members are relatively pivoted; means for adjustably mounting the pin on one of said push members to maintain said pins parallel when said push members are relatively pivoted; a pair of suspension beams centrally pivoted for longitudinal swinging movement above said push members; a cross member connecting the forward ends of said beams, said cross member including means allowing limited relative pivotal movement of said beams; anchor means associated with the rearward ends of said suspension beams for adjustably securing said beams in relatively pivoted positions; crank members carried by the forward ends of said beams; links connecting said crank members and said blade carrying frame; and actuating means for simultaneously operating said cranks regardless of the relative pivoted positions of said beams and said push members to raise and lower said blade carrying frame.

9. In an earth moving machine of the character described adapted to be carried by a tractor, the combination of: a pair of relatively spaced push members pivoted on said tractor for independent vertical swinging movement; a longitudinally disposed bearing pin carried adjacent the forward end of each push member; a blade carrying frame comprising a rigid structure journalled on said bearing pins for transverse tilting movement with respect to said push members; and means for adjustably mounting the pin on one of said push members for swinging the axis of said pin relative to the axis of said push member when said push members are relatively pivoted to tilt said blade carrying frame.

10. In an earth moving machine of the character described adapted to be carried by a tractor, the combination of: a pair of relatively spaced push members pivoted on said tractor for independent vertical swinging movement; a longitudinally disposed bearing pin carried adjacent the forward end of each push member; a blade carrying frame comprising a rigid structure journalled on said bearing pins for transverse tilting movement with respect to said push members; and mechanism adjustably mounting the pin on one of said push members, said mechanism comprising a socket portion on said push member, a head portion formed on said pin rotatable in said socket portion to swing said pin in one plane relative to said push member, and means for locking said pin in various angled positions relative to said push member whereby the pins of both of said push members are maintained parallel when said push members are relatively pivoted to tilt said blade carrying frame.

JOHN M. CORBETT.